G. R. Moore,
Making Sheet-Metal Vessels.
Nº 29,808.     Patented Aug. 28, 1860.
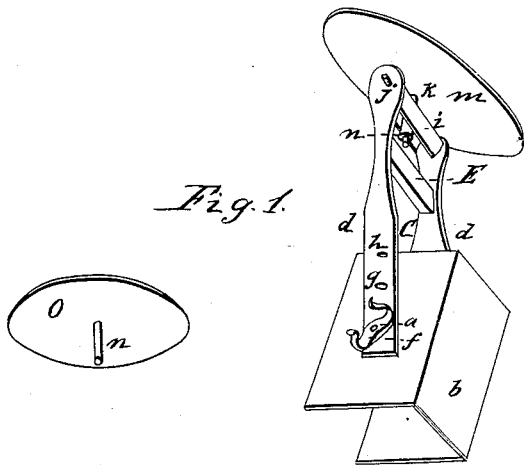
Fig. 1.
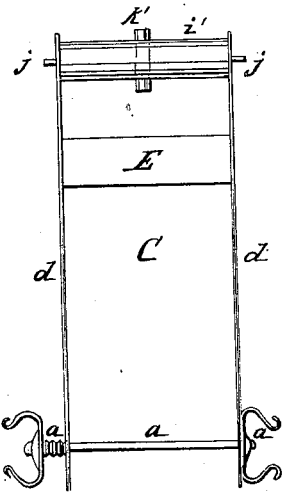
Witnesses:
Chas. F. Helfrecht
Thomas Shreiner
Inventor:
Geo. R. Moore

UNITED STATES PATENT OFFICE.

GEORGE RODNEY MOORE, OF PITTSBURG, PENNSYLVANIA.

IMPROVED GAGE FOR DOUBLE-SEAMING MACHINES.

Specification forming part of Letters Patent No. 29,868, dated August 28, 1860.

*To all whom it may concern:*

Be it known that I, GEO. R. MOORE, of the city of Pittsburg, in the county of Allegheny and State of Pennsylvania, have invented certain Improvements in Gages for Double-Seaming Machines for Sheet Metals; and I do hereby declare the following is a full and exact description thereof, reference being had to the accompanying drawings, and to the letters of reference marked thereon.

The object of my invention is to afford such a gage for my own patent double-seamer and other machines of like construction that even unskillful workmen may be able by its aid to keep large flaring dishes—like milk-pans, &c.—steady and free from wabbling while they revolve and the edge to be double-seamed is passing through between the double-seaming rollers. Let it be understood that the gage forms no essential part of the double-seamer, but is simply designed for such articles as by reason of their great size or flaring shape are difficult for the workman to hold steady upon the lower roller of the double-seamer. My former gage for the same purpose was a simple sliding rest attached by a thumb-screw to the frame of the double-seamer just below this lower roller, upon which the articles are placed for double-seaming. This gage is attached to the frame of the double-seamer at the same place, and when adjusted to the work is also tightened by a thumb-screw.

Figure 1 is a perspective view.

*a* is the thumb-screw and bolt by which the gage is fastened upon the double-seamer.

*b* is a clamp to clasp the frame of the double-seamer and avoid the necessity of cutting holes through it in attaching the gage. When the thumb-screw is tightened, the gage-frame keeps its place by friction.

*c* is the proper frame of the gage, consisting of two side pieces, *d d*, firmly combined by a cross-bar, *e*. This frame is shortened or lengthened, and acts as an adjustable holder of the other parts by changing the bolt from one set of holes, *f*, to another, *g* or *h*.

*i* is an adjustable arbor having one axis, *j j*, and a socket, *k*. The arbor yields or turns enough upon its axis to allow the face of the gage *m* always to come flat upon the bottom of the dish to be double-seamed. The socket *k* receives the gage face or disk *m* by its journal *n*, which revolves in it as a center. Now, the center of this disk or gage face being adjusted so as to agree with the center of the dish to be double-seamed, both the disk and the dish will revolve together and run true.

*o* is a disk of another size, to make it obvious that the workman may have any variety of sizes he chooses.

Having thus fully described my invention, what I claim, and desire to secure by Letters Patent, is—

The rotary disk or face of the gage *m*, also the adjustable arbor *i*, or any of their equivalents.

GEO. R. MOORE.

Witnesses:
 CHAS. F. HELFFRUCHT,
 THOMAS SHREINER.